UNITED STATES PATENT OFFICE 2,344,364

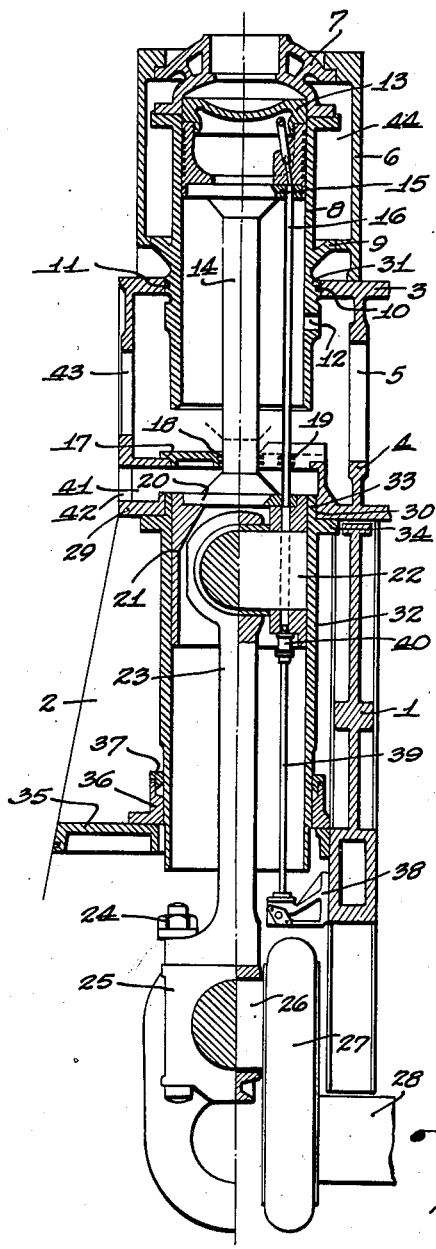

INTERNAL COMBUSTION ENGINE WITH CROSSHEAD

Ove Petersen, Gentofte, near Copenhagen, and Mads Lindberg-Nielsen, Copenhagen, Denmark; vested in the Alien Property Custodian Application January 29, 1942, Serial No. 428,778
In Denmark May 31, 1941

4 Claims. (Cl. 123—197)

In internal combustion engines with crosshead the crosshead is generally made in the form of a forged body which has an attachment hole, in which the end of the piston rod fits, and crosshead journals around which the connecting rod grips, and one or more plane sliding surfaces through which the side thrust is transmitted to the guide or guides fitted on the rigid parts of the framing of the engine.

This construction has hitherto been regarded as the only suitable construction for heavy internal combustion engines arranged for larger outputs per cylinder, to which type of internal combustion engines this invention chiefly relates. The said known construction suffers, however, from certain drawbacks, the remedying of which is the chief aim of this invention.

By this invention which relates to a new construction of the crosshead and the crosshead guide in an internal combustion engine, especially an internal combustion engine arranged for great outputs per cylinder, the drawbacks of the known crosshead constructions are avoided.

The essential feature of the invention is first and foremost that the crosshead is made in the shape of a short trunk piston. In this piston there is in the usual way, e. g. by force fitting, fitted a gudgeon which forms the point of application for the connecting rod. The piston-shaped crosshead is guided in a cylindrical liner, one end of which is secured to and centered in relation to the rigid framing parts of the engine, whereas the other end is preferably supported against rigid parts of the framing so as to be able to slide in the direction of the axis of the cylinder in such a way that mobility in any transverse direction is prevented.

The essential advantages obtained by this construction consist in an easier and cheaper construction of the crosshead body proper, which assumes the shape of a simple cylindrical trunk piston. To this the connecting rod may be attached by a simple cylindrical gudgeon which is cheap to manufacture and especially possesses the advantage that it may be hardened in its full length and can be given an ample bearing area. The attachment of the piston rod to the crosshead may also be effected in a simpler and more expedient way than hitherto, it being possible to provide the end of the piston rod with a flange which rests against a corresponding turned surface on the end of the crosshead body and is secured thereto by means of bolts that are easily accessible for tightening.

With regard to the crosshead guide there will also be obtained a considerable simplification and improvement in comparison with the hitherto used constructions. The cylindrical guiding liner e. g. forms a tubular girder of very considerable strength and rigidity and may therefore be constructed of a smaller weight than a plane crosshead guide for taking up the same side thrust. The cylindrical shape of the crosshead guide furthermore entails that the sliding surfaces and all the alignment surfaces necessary for the erection may be machined in the same fixing in the turning lathe, and as the alignment surfaces on the rigid engine parts which decide the position of the liner in relation to the cylinder liner and the other parts, in relation to which the crosshead guide is to be aligned, may likewise be made by operations that automatically ensure their proper mutual orientation, the correct alignment of the crosshead guide in relation to the other engine parts will thus be a matter of course when the parts are assembled. The difficult and time-wasting alignment work that was formerly necessary at the erection of the engine and at the assembling, when later on the engine had been taken apart, thus becomes superfluous.

The new construction offers essential advantages also with regard to the taking up of the guide pressures. The fact is that the crosshead guide can take up side thrusts in all possible directions in a quite uniform manner.

In cases where the crosshead guide is centered in a hole in the bottom of a box-shaped longitudinal girder it is advantageous to close the latter downwardly by placing a cover over each centering hole, in which cover a stuffing box must be provided, through which the piston rod passes. Hereby is obtained in part that it is possible in a way known per se to use the box-shaped girder as a scavenging air receiver, in part that above the piston-shaped crosshead there will be formed a space that may be used as a pumping chamber for the supply of scavenging and charging air, as the piston-shaped crosshead in connection with the cylindrical liner thus will form a pump.

The stroke of this pump is the same as that of the working piston, and the amount of air supplied must therefore be adapted by a suitable choice of the diameter of the piston-shaped crosshead. In two-stroke engines the diameter of the crosshead must thus be somewhat greater than that of the working piston, if the whole amount of air required should be supplied by the pumping arrangement here mentioned. Normally it will be sufficient when the useful piston area of the crosshead is made 15-20% larger than that of the working piston. In that case the invention thus makes it possible to omit completely the special blower otherwise required in two-stroke engines.

What is necessary for understanding the invention and the secondary features thereof will appear from the following description of an embodiment in connection with the accompanying drawing, which partly diagrammatically shows a vertical section through a cylinder unit of a two-stroke internal combustion engine constructed in accordance with the invention. We point out that the lefthand half of the drawing shows a section at right angles to the longitudinal direction of the crank shaft and the engine, while the righthand half of the drawing shows a section parallel to the longitudinal direction.

On the drawing 1 and 2 designate frames erected on the bed plate, not shown, of the engine at right angles to the longitudinal direction of the engine between the cylinder units. On these frames rests a box-shaped girder 3, which, as shown on the drawing, may be in one piece for several cylinders and be stayed by internal partitions 4, or which may be made up of elements bolted together, each of which corresponds to a cylinder unit.

On the top of the box-shaped girder 3 which extends in the longitudinal direction of the engine are placed cylinder frames 6, of which frames there is supposed to be one for each cylinder unit, and to which the cover 7 of the cylinder shown is bolted. For the sake of simplicity the usual mechanisms on the cylinder cover are not shown on the drawing. To the cylinder cover the cylinder liner 8 is bolted in the usual manner, and the lower part of the freely depending liner is carried down through and guided transversely in a centering hole 31 in the upper side of the box-shaped girder 3. In order that the liner may be able to expand freely in the axial direction for the elimination of heat expansions it is movable axially in the centering hole 31, where a sealing is effected by means of an inserted sealing ring 11 placed in a turned groove in the cylindrical centering surface 10 on the liner co-operating with the centering hole 31.

The space 44 between the cylinder frame 6, the cylinder cover 7, and the upper part of the cylinder liner 8 serves as a cooling jacket, it being closed at the bottom by means of a collar 9 on the cylinder liner fitting into a hole in the bottom of the approximately box-shaped cylinder frame.

In the end of the cylinder liner 8 projecting down into the box-shaped girder 3 are scavenging ports 12 which in the lower dead point position of the piston 13 are above the upper edge of the latter and permit scavenging air to flow from the interior of the box-shaped girder into the cylinder.

The piston 13 rests on and is bolted to an upper flange 15 on the piston rod 14 and is cooled by a cooling medium preferably oil, which is supplied through a telescope pipe 16 and led away through a corresponding telescope pipe, not shown.

In the bottom 29 of the box-shaped girder 3 there is, exactly co-axial with the centering hole 31 for the cylinder liner, a centering hole 30, and some distance above the latter the lower side of the girder is closed by means of a cover 17, which is fitted in halves around the piston rod and the said telescope pipes and has stuffing boxes, 18 and 19 respectively, for these.

The piston rod has at its lower end a flange 20, by which it rests against and is bolted to a crosshead 21, which has the form of a short cylindrical trunk piston. Through the material of this piston are carried longitudinal borings, which are in line with the telescope pipes 16 rolled into holes in the flanges 15 and 20 of the piston rod and at the bottom have stuffing boxes 40, through which the stationary part 39 of the telescope pipes is introduced.

In the piston-shaped crosshead 21 is fitted a cylindrical gudgeon 22, which may be fixed by any suitable means, preferably by force fitting. The gudgeon 22 forms in the usual way a journal for the upper end of a connecting rod 23, the lower end of which is secured by bolts 24 to a connecting rod bearing 25, that is attached to a crank 26. The crank shaft of the engine is designated by 28, and one of the crank arms belonging to the said cylinder unit by 27.

The cylindrical piston-shaped crosshead 21 travels in a crosshead guide 32 which has the form of a cylindrical liner. The cylindrical guiding liner has at the top a centering collar 33, with which it fits into and is centered in the previously mentioned centering hole 30 in the bottom 29 of the box-shaped girder 3, whereby its proper position in the side direction is ensured in relation to the girder 3 as well as in relation to the cylinder liner, which is guided in the centering hole 31 placed co-axially with the centering hole 30. These two centering holes should preferably be produced in the same fixing.

The alignment of the longitudinal axis of the cylindrical cross head guide in relation to the girder 3 is ensured by means of a turned flange at the upper end of the crosshead guide, by means of which flange the crosshead guide is bolted to the planed under side of the box-shaped girder. Hereby is at the same time ensured the accurate alignment of the crosshead guide and the cylinder liner, the axial alignment of the latter likewise being definitely decided in relation to the girder 3 on account of the mode of suspending the cylinder liner described above.

The tubular crosshead guide 32 has because of its sectional shape a considerable rigidity and may therefore be made comparatively light. A further economy of material can be obtained in the case that the lower end of the crosshead guide is stayed in the side direction in such a way that part of the side thrust of the crosshead is taken up here and transmitted to the framing of the engine. This is, in the embodiment shown, effected by means of a collar 36 which is fitted around a turned surface at the lower end of the crosshead guide and, after the alignment and securing of the latter, secured to a plate 35 that is inserted between the frames 1 and 2 and suitably made in halves. This plate may expediently at the same time serve to close the crank case upwardly, in which case the axially movable connection between the crosshead guide and the collar 36 should be packed tight by a packing 37 as shown. Directly below the lower part of the crosshead guide are found brackets 38 that carry the stationary telescope pipes 39 before mentioned.

The whole construction described is held together in the usual way by vertical bolts or corresponding tension members, of which some may e. g. serve for securing the cylinder frame 6 to the box-shaped girder 3, while others secure the latter to the transverse girders or corresponding members of the bed-plate of the engine on which the main bearings for the crank shaft are placed.

In the embodiment shown the interior of the box-shaped girder 3 serves, as previously mentioned, as a scavenging air receiver, and the girder has for this purpose an opening 43 in one of its side walls, through which the scavenging air may be admitted. In the previously mentioned internal transverse walls 4 there is likewise a hole 5. It may, however, also be expedient to let the interior of the girder be divided into a series of separate receiver chambers, one for each cylinder, whereby the pressure and oscillation conditions may better be controlled during the scavenging and the charging.

Between the cover 17 which closes the box-shaped girder below and the upper end of the cylindrical crosshead guide there is a space 41, which opens out with an opening 42 below on the side of the box-shaped girder. This space 41 serves for the control of the tightness of the stuffing boxes 18 and 19 besides for ensuring that no splash oil from the crosshead guide will penetrate into the girder 3.

In the embodiment shown the engine is a two-stroke engine, and the whole amount of scavenging- and charging air required can be supplied by the crosshead pump. The diameter of the piston crosshead must therefore be so much greater than the diameter of the working piston that the effective pumping piston area will become about 15-20% larger than the effective area of the working piston. This demand as to the proportioning of the crosshead is in practice very well compatible with the regards as to proportioning that must be paid as to an easy taking apart of the engine for inspection. It being presupposed that it is a question of the most common inspection- and repair works, i. e. examination and overhauling of cylinder liner and piston, the method used here may be as follows.

At first the cylinder frame 6 is loosened from the girder 3 and removed from the engine by being lifted vertically. The piston is then accessible for examination and changing of piston rings, but may in case that heavier repairs are necessary be taken off by disconnecting it from the piston rod, or by the piston rod being disconnected from the crosshead. Finally the piston with piston rod, crosshead, and the connecting rod may be taken out by the connecting rod being disconnected from the connecting rod bearing 25, after which the whole may be pulled vertically out of the engine without further taking apart of the latter. Here is only presupposed that the crosshead can pass upwards through the girder 3, i.e. that the hole for the cover 17 is of a slightly greater diameter than the crosshead, and that the centering hole for the cylinder liner is also slightly larger than the crosshead. Both of these conditions can easily be fulfilled, and thus there is no difficulty in arranging the crosshead pump for supplying the whole amount of scavenging- and charging air required, even when the engine is a two-stroke engine.

In that case the crosshead pump may draw in air direct from the atmosphere and press the air through a piping leading from the pressure valve direct into the girder 3 serving as a scavenging air receiver.

The invention is not bound to the construction shown and described, which is given as an example of an especially advantageous engine type constructed in accordance with the invention. The invention can wholly or partly be applied also in other engine types, e. g. in four-stroke engines, and in engines with another total erection of framing and cylinder construction. The advantages of the automatic alignment of crosshead guide and cylinder liner will be obtained in all engine constructions where it is possible to centre and/or secure the crosshead guide and the cylinder liner to a common rigid engine part, which may otherwise very well consist of several individual elements that are mutually connected more or less permanently. There is nothing to prevent applying the invention also in double-acting engines, in which case the special construction of the telescope pipe connection to the working piston shown here cannot, however, be applied.

We claim:

1. In an internal combustion engine, a rigid frame structure including a girder having openings in the top and bottom thereof, an engine cylinder supported on said girder and having a portion thereof centered in one of the openings, a piston in said cylinder, a crosshead connected with said piston, a cylindrical guide for said crosshead, a centering member on one end of said guide secured in the other opening, said guide being mounted at its other end for axial sliding movement in said frame structure.

2. In an internal combustion engine, a rigid frame structure having alined openings therein, an engine cylinder supported on the frame structure coaxially of said openings, a piston in said cylinder, a crosshead guide connected with said piston, a cylindrical guide for said crosshead fixed at one end in one of said openings and a collar loosely applied to the other end of said guide and secured in the other opening to accommodate axial movement of said guide.

3. In an internal combustion engine, a rigid frame structure including a girder having an opening therein, an engine cylinder supported on said girder in line with said opening, a piston in said cylinder, a crosshead connected with said piston, a cylinder guide for said crosshead fixed at one end to one part of said frame structure and slidably engaged at its other end with another part of said frame structure, said engine cylinder and guide being located at opposite sides of said opening and said opening having a diameter sufficient to enable the crosshead to be removed therethrough and a removable closure for said opening.

4. In an internal combustion engine, a rigid frame structure including a box-shaped girder having spaced bottom members provided with openings, an engine cylinder supported on said girder, a piston mounted in said cylinder, a crosshead connected with said piston, a cylindrical guide for said crosshead fixed at one end in the opening of one of the bottom members and mounted at its opposite end for axial movement in said frame structure, said crosshead being adapted for withdrawal through the opening in the other bottom member, and a removable closure plate for the opening in the second mentioned bottom member.

OVE PETERSEN.
MADS LINDBERG-NIELSEN.